United States Patent
Ty Tan et al.

(10) Patent No.: US 9,011,020 B2
(45) Date of Patent: Apr. 21, 2015

(54) OPTICAL INTERCONNECT

(75) Inventors: Michael Renne Ty Tan, Menlo Park, CA (US); Paul Kessler Rosenberg, Sunnyvale, CA (US); Huel Pei Kuo, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 181 days.

(21) Appl. No.: 13/384,883

(22) PCT Filed: Jan. 6, 2010

(86) PCT No.: PCT/US2010/020222
§ 371 (c)(1),
(2), (4) Date: Jan. 19, 2012

(87) PCT Pub. No.: WO2011/084155
PCT Pub. Date: Jul. 14, 2011

(65) Prior Publication Data
US 2012/0263415 A1   Oct. 18, 2012

(51) Int. Cl.
*G02B 6/34* (2006.01)
*G02B 6/43* (2006.01)
*G02B 6/30* (2006.01)
*G02B 6/32* (2006.01)

(52) U.S. Cl.
CPC .. *G02B 6/43* (2013.01); *G02B 6/34* (2013.01); *G02B 6/30* (2013.01); *G02B 6/322* (2013.01)

(58) Field of Classification Search
None
See application file for complete search history.

(56) References Cited

U.S. PATENT DOCUMENTS

| 4,420,219 A | 12/1983 | Muchel |
| 4,943,136 A | 7/1990 | Popoff |
| 5,071,216 A | 12/1991 | Sullivan |
| 5,155,784 A | 10/1992 | Knott |
| 5,208,884 A | 5/1993 | Groh et al. |
| 5,216,732 A | 6/1993 | Knott |
| 5,309,537 A | 5/1994 | Chun et al. |
| 5,337,388 A | 8/1994 | Jacobowitz et al. |
| 5,420,954 A | 5/1995 | Swirhun et al. |
| 5,424,573 A | 6/1995 | Kato et al. |

(Continued)

FOREIGN PATENT DOCUMENTS

| CN | 1234615 A | 11/1999 |
| CN | 101334503 A | 12/2008 |

(Continued)

OTHER PUBLICATIONS

European Search Report (Supplementary), Oct. 11, 2013. EP Patent Application No. 10842367.4.

(Continued)

*Primary Examiner* — Tina Wong
(74) *Attorney, Agent, or Firm* — Van Cott, Bagley, Cornwall & McCarthy

(57) ABSTRACT

An optical interconnect includes an optical fiber which terminates in a interconnect body and a micro lens which collimates light exiting the optical fiber to produce a collimated beam. A first personality module is configured operate on the collimated beam; the first personality module being aligned with and detachably connected to the interconnect body. The optical interconnect is configured to be inserted into a socket in an optical backplane, the first personality module being further configured to operate on light passing from the optical backplane into the optical interconnect.

20 Claims, 14 Drawing Sheets

(56) References Cited

U.S. PATENT DOCUMENTS

| | | |
|---|---|---|
| 5,440,658 A | 8/1995 | Savage, Jr. |
| 5,521,992 A | 5/1996 | Chun et al. |
| 5,537,503 A | 7/1996 | Tojo et al. |
| 5,545,893 A | 8/1996 | Brown et al. |
| 5,562,838 A | 10/1996 | Wojnarowski et al. |
| 5,664,039 A | 9/1997 | Grinderslev et al. |
| 5,761,350 A | 6/1998 | Koh |
| 5,768,458 A | 6/1998 | Ro et al. |
| 5,774,245 A | 6/1998 | Baker |
| 5,793,919 A | 8/1998 | Payne et al. |
| 5,796,896 A | 8/1998 | Lee |
| 5,809,191 A | 9/1998 | Stevens et al. |
| 5,960,138 A | 9/1999 | Shimoji et al. |
| 6,007,257 A | 12/1999 | Ogawa et al. |
| 6,016,211 A | 1/2000 | Szymanski et al. |
| 6,062,740 A | 5/2000 | Ohtsuka et al. |
| 6,147,817 A | 11/2000 | Hashizume |
| 6,173,099 B1 * | 1/2001 | Kiernicki et al. ............... 385/78 |
| 6,227,719 B1 | 5/2001 | Aoki et al. |
| 6,345,132 B1 | 2/2002 | Picard et al. |
| 6,370,292 B1 * | 4/2002 | Strake ............................ 385/14 |
| 6,390,690 B1 | 5/2002 | Meis et al. |
| 6,481,886 B1 * | 11/2002 | Narendrnath et al. ........ 374/141 |
| 6,597,824 B2 | 7/2003 | Newberg et al. |
| 6,658,175 B2 | 12/2003 | Zami et al. |
| 6,763,158 B1 | 7/2004 | Zhang et al. |
| 6,789,953 B1 | 9/2004 | DeJong et al. |
| 6,819,827 B2 | 11/2004 | Kobayashi et al. |
| 6,842,551 B1 | 1/2005 | Vogley |
| 6,845,184 B1 | 1/2005 | Yoshimura et al. |
| 6,863,444 B2 | 3/2005 | Anderson et al. |
| 6,967,347 B2 | 11/2005 | Estes et al. |
| 6,973,248 B2 * | 12/2005 | Kropp ........................... 385/131 |
| 7,010,232 B1 | 3/2006 | Ott |
| 7,086,788 B2 | 8/2006 | Mazotti et al. |
| 7,336,900 B2 | 2/2008 | DeCusatis et al. |
| 7,366,423 B2 * | 4/2008 | Levy et al. .................... 398/164 |
| 7,541,058 B2 | 6/2009 | Chan et al. |
| 7,551,811 B2 | 6/2009 | Aoki et al. |
| 7,664,404 B2 * | 2/2010 | Maul et al. .................... 398/164 |
| 7,729,569 B2 * | 6/2010 | Beer et al. ....................... 385/14 |
| 7,826,692 B2 * | 11/2010 | Mongold .......................... 385/14 |
| 2003/0174965 A1 * | 9/2003 | Nishimura ....................... 385/50 |
| 2004/0096152 A1 * | 5/2004 | Nakama et al. ................. 385/31 |
| 2004/0247242 A1 | 12/2004 | Blasingame et al. |
| 2005/0135742 A1 | 6/2005 | Basavanhally et al. |
| 2006/0188265 A1 | 8/2006 | Maul et al. |

FOREIGN PATENT DOCUMENTS

| | | |
|---|---|---|
| EP | 0508309 A2 | 10/1992 |
| EP | 1345052 B1 | 9/2005 |
| JP | 04-301812 | 10/1992 |
| WO | WO-0188586 A2 | 11/2001 |
| WO | WO-2004083916 A1 | 9/2004 |

OTHER PUBLICATIONS

Robert Bicknell et al., "Fabrication and characterization of hollow metal waveguides for optical interconnect applications," Applied Physics A, 2009, pp. 1059-1066, vol. 95, Springer-Verlag.

* cited by examiner

OPTICAL INTERCONNECT

BACKGROUND

Light beams or optical signals are frequently used to transmit digital data. For example, optical signals can be used to transmit data over large distances, between electronic components on nearby circuit boards, or between electronic components on a single circuit board. One aspect of optical communication is the interconnection between the optical channel to various other devices such as backplanes, electronic devices, semiconductor lasers, photo-detectors, other components. A good optical interconnect has high coupling efficiency, ease of making the coupling, modularity, high reliability, and low cost.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1A:
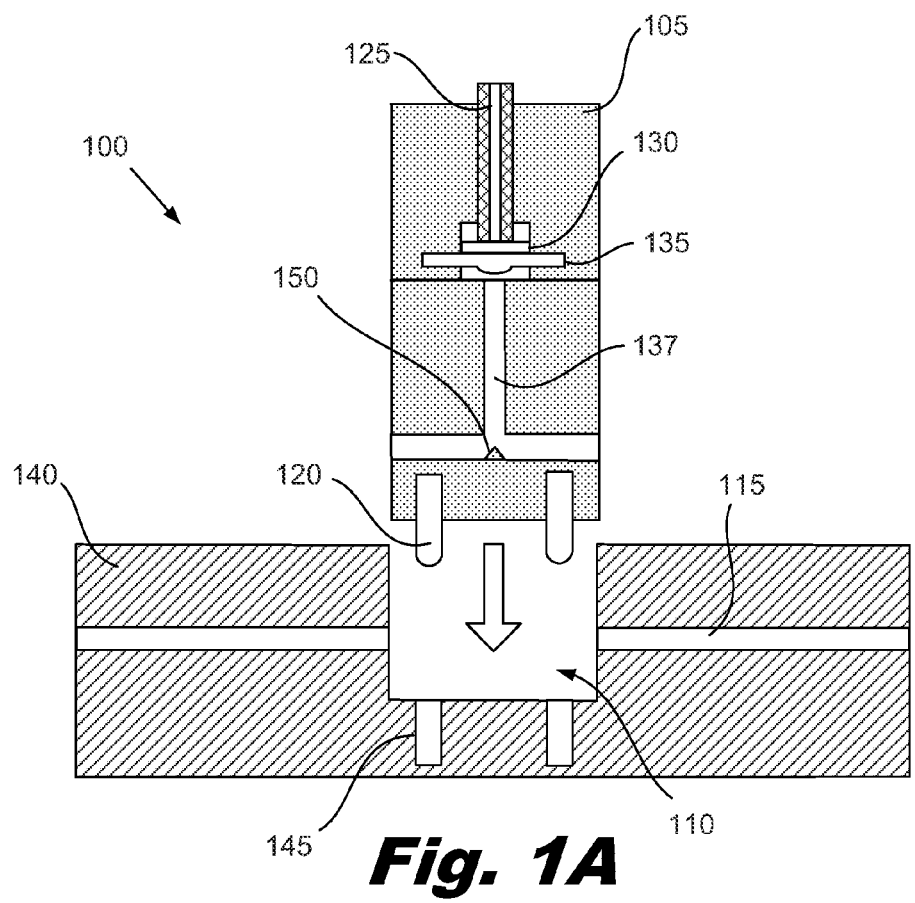
FIGS. 1A and 1B are cross-sectional diagrams of an illustrative embodiment of an optical interconnect system, according to one embodiment of principles described herein.

Light beams or optical signals are frequently used to transmit digital data. For example, optical signals can be used to transmit data between electronic components on a single circuit board, or between electronic components on nearby circuit boards. These optical signals can be routed using waveguides. Waveguides carry optical energy by imposing boundaries which control the expansion of the optical energy and guide it to a desired location. One aspect of optical communication is the interconnection between the optical channel to various other devices such as backplanes, electronic devices, semiconductor lasers, photo-detectors, other components. A good optical interconnect between waveguides should have high coupling efficiency, ease of making the coupling, low cost, reconfigurability, produce a reliable connection, and be resistant to obsolescence due to ability to perform as system bandwidth increases.

One of the challenges in forming optical interconnections is that the optical channel is typically very small (on the order of 10 microns for a single mode optical fiber and on the order of 62.5 microns for multi-mode optical fiber). Another challenge is to deal with the divergence of the light signal as it exits these optical fibers. To align this fiber with another fiber typically requires expensive, high precision components. Making this connection is also time consuming and the resulting connection is often very permanent. Consequently, reconfiguring optical systems often involves discarding a large quantity of hardwired hardware which is not economical to rewire.

It has been discovered that by collimating light that exits an optical channel into a beam which has a diameter greater than the channel itself, the alignment accuracy for making an optical interconnection can be decreased. Consequently, much less expensive materials and manufacturing processes can be used to generate parts with the desired level of precision. The components of an optical interconnection system can then be modularized such that they are easily reconfigurable and reusable. This provides a low cost interconnection fabric which has plug and play reconfigurability. The modular optical interconnects allow for point-to-point connections, splitting, combining, multicasting, on the same optical backplane. These modular optical interconnects are compatible with either hollow metal waveguides or regular solid core optical waveguides. The hollow metal waveguides have the property that the light propagating through the hollow metal waveguides is nearly collimated, has low attenuation, and exhibits a very low divergence angle as it exits the waveguide. This low divergence angle allows coupling to other hollow metal waveguides through a small air gap with low loss.

Further, a variety of optical functionalities can be built into the interconnects. For example, these functionalities may include: an optical tap which removes a predetermined amount of optical power from the waveguide; an optical splitter which takes optical power from one port and splits the power to two or more separate beams; an optical combiner which takes inputs from two or more ports and combines their optical power to one output port; a wavelength selective filter which removes a particular wavelength form a wavelength multiplexed beam; and a transmit/receive configuration. By integrating additional functionality into the interconnects, the optical fabric can be reconfigured by simply unplugging the interconnect component and replacing it with a different interconnect component with different functionality.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

It is common for devices to be optically connected to a backplane. As used in the specification and appended claims, the term "backplane" refers to a structure which has multiple communication channels which can be accessed through a number of integrated sockets or other receptacles. For example, a backplane may contain a common bus to which a number of separate devices may connect. Backplane communication channels may include electrical wires, optical fibers, hollow metal waveguides, or other channels. The backplane may contain optical to electrical transducers, signal processing electronics, various types of light sources and detectors. Where the term "optical backplane" is used, the backplane contains at least one channel which is configured to convey optical signals through the backplane. Optical backplanes can be divided into two groups: active backplanes which are electrically enabled to transmit and receive electrical and optical signals and passive backplanes which transfer and switch signals generated elsewhere. The principles described below can be applied to both active backplanes, passive backplanes or hybrid backplanes.

In the specification and appended claims, the term "personality module" refers to a detachable, interchangeable element which contains at least one optical element which operates on incoming and/or outgoing light to significantly alter the characteristics of the light. These characteristics may include the direction or spectral content of the light. The personality module is detachably aligned to an interconnect and provides plug-and-play reconfiguration of an optical interconnect system. The personality modules may be connected to an optical pigtail which originates from an external component or originates from a backplane. In some examples, a personality module may be placed at each end of an optical pigtail. The modular nature of the personality modules can provide advantages in testing, flexibility in configuring systems, ease of assembly, and compatibility between a wide variety of optical systems.

FIG. 1A is a cross-sectional diagram of an illustrative optical interconnect system (100). According to one illustrative embodiment, the optical interconnect system (100) includes a modular optical interconnect (105) and a corresponding socket (110) formed in an optical backplane (140). The modular optical interconnect (105) is formed on a terminal end of an optical fiber (125).

The modular optical interconnect (105) includes one or more micro optics (135) which shape the optical energy which passes out of or into the optical channel (125). According to one illustrative embodiment, the micro optics (135) may be formed using precision plastic injection molding. The micro optics may include a variety of simple or compound lenses. For example, simple lenses may be formed with spherical or aspherical profiles. A variety of coatings, such as scratch resistant coatings and anti reflection coatings, can be deposited on over the outer surfaces of the micro optics.

Additionally, to avoid reflections off the end facet of the optical fiber (125), an index matching adhesive (130) can be interposed between the optical fiber (125) and the micro optics (135). An index matching adhesive (130) can be selected based on a number of factors, including closely matching the optical index of refraction of the adhesive to the optical index of refraction of the optical channel (125). In designs where the optical index of refraction of the optical channel (125) is also matched to the micro optics (135), the optical index of refraction of the adhesive can match both the optical channel (125) and the micro optics (135). For example, the typical optical index of refraction of a typical optical fiber may be approximately 1.48. The micro optics may be formed from a polymer, such as poly methyl methacrylate which has an optical index of refraction of approximately 1.488. An adhesive, such as acrylate based material with a substantially similar index of refraction, can be interposed between the optical fiber and the micro optics. By matching the optical indexes of refraction of the various components, the optical discontinuity at the interface between the various materials can be greatly reduced or eliminated. This minimizes the Fresnel reflections and scattering at the various optical interfaces. The example given above is only one illustrative embodiment. A wide variety of materials and configurations could be used to form the interconnect components.

According to one illustrative embodiment, the ends of the optical fiber (125) may be "saw cut" when an index matching adhesive (130) is used. A saw cut refers to relatively inexpensive and quick methods of cutting an optical fiber to a desired length which results in a relatively rough end surface. A saw cut fiber generally exhibits large optical losses and a large amount of scattering. However, when an index matching optical adhesive is used to bond the end of a saw cut fiber to another optical element, the optical adhesive fills the rough texture of the end of the saw cut fiber and drastically reduces the negative effects of the rough texture on light transmission. Consequently, where index matching adhesive is used, the fiber can be saw cut without the need for time consuming post polishing or coating the end of the fiber.

A waveguide T (137) forms an optical path which extends downward from the micro optics and branches into left and right paths. According to one illustrative embodiment, the waveguide T (137) is formed from intersecting hollow metal waveguide segments. The waveguide T (137) may contain one or more optical elements (150). According to one illustrative embodiment, the horizontal segment of the waveguide T (137) is configured to be aligned with an optical channel (115) which passes through the optical backplane (140).

The modular optical interconnect (105) is configured to be received by a socket (110) in the optical backplane (140). The modular optical interconnect (105) may include a variety of alignment features, including specific exterior geometry, channels, pins, or other alignment features. According to one illustrative embodiment, the modular optical interconnect (105) includes at least two alignment pins (120) which are received by alignment holes (145) when the modular optical interconnect (105) is inserted into the socket (110).

Figure 1B:
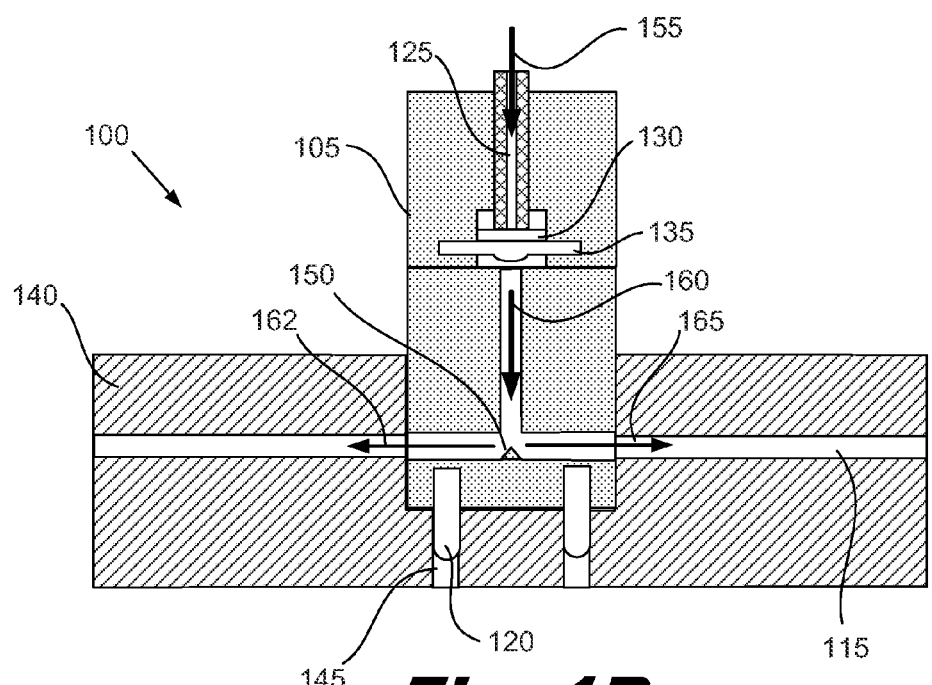

In FIG. 1B, the modular optical interconnect (105) has been inserted into the socket (110). The alignment pins (120)

are received into alignment holes (145) to provide rotational and translational alignment between the modular optical interconnect (105) and the optical backplane (140). The waveguide T (137) is then aligned with the hollow metal waveguide (115).

An input beam (155) passes along the optical fiber (125), through index matching adhesive (130) and is collimated by the micro optics (135). This collimated beam (160) passes down the waveguide T (137) and encounters an optical element (150). The optical element (150) can be any one of a number of optical components. In this case, the optical element (150) is a reflective wedge which divides the collimated beam into two output beams (162, 165) which pass horizontally into the hollow metal waveguides (115).

In this illustrative example, the optical interconnect system (100) has converted refractively guided light in an optical fiber (125) into a collimated beam (160). The collimated nature of the beam (160) is well adapted for traveling through hollow metal wave guides (115) because it minimizes the number of reflections of the light with the sides of the hollow metal wave guides (115).

Hollow metal waveguides (115) include a hollow air core surrounded by highly reflective metallic wall. Hollow metal waveguides can be fabricated in a variety of substrates, including silicon, glass or plastic. A variety of patterning processes including sawing, laser machining, wet and dry etching, injection molding, compression molding and other suitable processes can be used to form the hollow metal waveguides. According to one illustrative embodiment, the sidewalls and bottom of these trenches are then metalized using a sputtering process to provide a highly reflective surface at the wavelengths of interest. For example, silver can be sputter coated into the trenches to provide the reflective coating. In some examples, it may be advantageous to overcoat the silver with a passivation layer, such as aluminum nitride, which protects the coating and prevents oxidization. Additionally an undercoat may be provided to improve the adhesion of the silver layer to the substrate. A waveguide cap can then be a bonded patterned substrate to cover the trenches and complete the hollow metal waveguides. Typical dimensions of a hollow metal waveguide cross-section may be approximately 150 microns.times.150 microns or 300 microns.times.300 microns. The size and geometry of the waveguides can be altered according to the specific design.

The low index air cores of the hollow metal waveguides result in several unique features not found in more widely investigated polymer-based waveguides. These hollow metal waveguides offer the potential of very low optical loss, low diffraction loss, and low modal dispersion required in optical interconnect systems. In contrast to polymer or other solid waveguides, the hollow metal waveguides do not have reflective losses at the input and output facets. Some embodiments of silver-coated hollow metal waveguides fabricated in silicon have achieved losses lower than 0.05 dB/cm. Air core of the hollow metal waveguides produce very little optical dispersion, which allows the hollow metal waveguides to transmit data at rates approaching terahertz frequencies.

Figure 2:
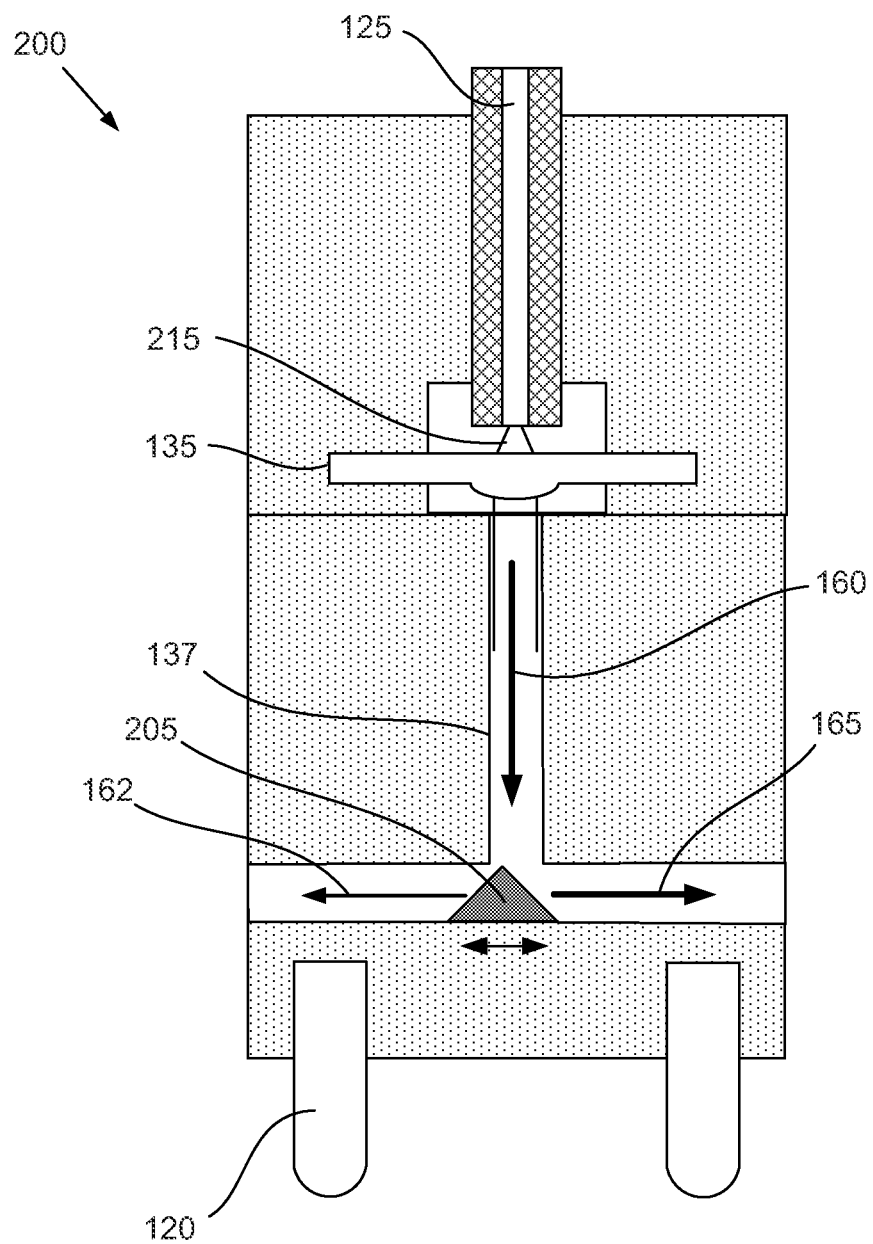
FIG. 2 is a diagram of an illustrative modular optical interconnect with an active optical element which divides an optical beam into two parts, according to one embodiment of principles described herein.

FIG. 2 is a diagram of an illustrative modular optical interconnect (200) which is similar to the modular optical interconnect (100, FIG. 1) which is illustrated in FIG. 1. One difference between the two optical interconnects is the lack of an index matching glue layer between micro optics (135) and the exit end of optical fiber (125). The rapidly diverging light (215) which exits the optical fiber (125) is collimated by the micro optics (135) and passes into the hollow metal waveguide (160).

At the intersection in the waveguide T (137), an optical element (205) performs an optical operation on the incident light beam (160). In this case, the optical element (205) is a reflective wedge which divides the light into a left output beam (162) and a right output beam (165). The horizontal position of the reflective wedge (205) can be altered to modify amount of light reflected in each direction. The range of horizontal positions in which the reflective wedge (205) could be placed is illustrated by a double headed arrow below the reflective wedge (205). For example, by sliding the reflective wedge (205) to the left, a greater portion of the collimated light (160) is reflected down the right branch of waveguide T (137). When the reflective wedge (205) is positioned to the left such that only the right slope of the wedge is presented to the collimated light (160), all of the collimated light (160) is reflected to the right. Conversely, when the reflective wedge (205) is positioned all the way to the right such that only the left slope of the wedge is presented to the collimated light (160), all of the collimated light (160) is reflected to the left. The percentage of collimated light (160) which is reflected into the left and right branches of the waveguide T can be varied by altering the position of the wedge (205).

Although FIG. 2 shows the light originating out of the optical fiber (125) and being transmitted into the optical backplane (140, FIG. 1), the same configuration can be used for the reverse operation. For example, two separate light beams which are propagating through the hollow metal waveguide (115, FIG. 1) can be reflected upward by the reflective wedge and into the micro optics. The micro optics (135) then focuses the light into the optical fiber (125) for transmission to an exterior component.

According to one illustrative embodiment, the reflective wedge (205) is permanently positioned at the desired horizontal location when the modular optical interconnect (200) is formed. Alternatively, the reflective wedge could be dynamically or manually translated within the modular optical interconnect (200) to alter the left/right splitting properties of the modular optical interconnect (200).

Figure 3A:
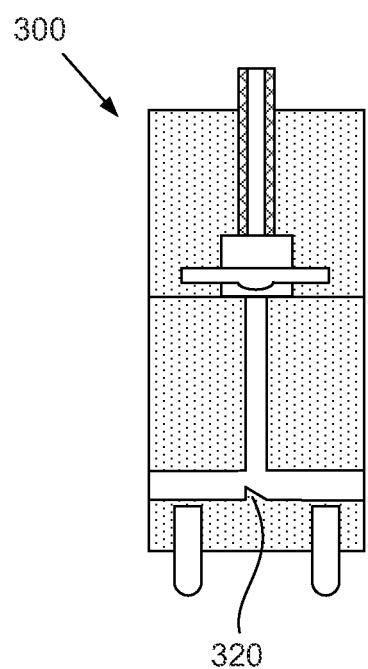
FIGS. 3A-3D are illustrative embodiments of modular optical interconnects which perform various optical operations, according to one embodiment of principles described herein.

FIGS. 3A-3D show various other illustrative optical elements (320, 325, 330, 335, 340) which can be used in a modular optical interconnect (300, 305, 310, 315). FIG. 3A shows a modular optical interconnect (300) which includes a low profile wedge (320) placed at the intersection of the waveguide T (137). In general, the light which is propagating through the hollow metal waveguide is fairly uniformly distributed over the cross-sectional area of the hollow metal waveguide. The low profile wedge (320) only covers a portion of the internal area of the hollow metal waveguide. Consequently, the amount of light which is reflected upward into the micro optics (135) is directly proportional to the portion of the internal area which the low profile wedge (320) covers. The remaining light is not reflected upward, but continues to travel down the hollow metal waveguide and exits the optical interconnect. This results in an area based optical tap which allows a portion of light traveling through an optical backplane to be diverted into the modular optical interconnect (300) without obstructing passage of the remaining light through the interconnect.

Figure 3B:
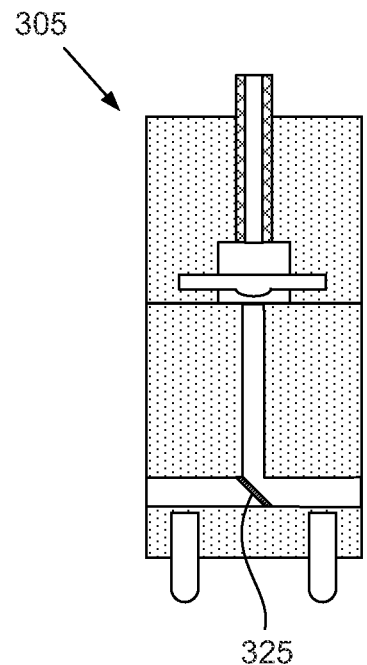

FIG. 3B is an illustrative modular optical interconnect (305) which includes an optical element (325) which extends at an angle across the horizontal branch of the waveguide T (137). According to one illustrative embodiment, this optical element (325) could be: a partially reflective film, an area based reflective film, a spectrally selective reflector, a polarization selective film, etc. For example, if the optical element (325) were a partially reflective film which extended across the entire area of the hollow metal waveguide (137), then a percentage of the light over the whole area will be reflected upward into the micro optics. For an area based reflective film, a portion of the film will be reflectively coated and the remainder of the film will remain transparent. Consequently, light which incident on the reflective portion of the film will be directed upward into the micro optics. Additionally or alternatively, the film may selectively reflect light based its spectral or polarization characteristics. For example, the film may reflect a specific wavelength or polarization upward, while allowing the light with other wavelengths or polarization to pass through the film and continue down the hollow metal waveguide. The optical element (325) may be a pellicle film, thin optical plate, a prism with an angled surface, or other suitable optical component.

Figure 3C:
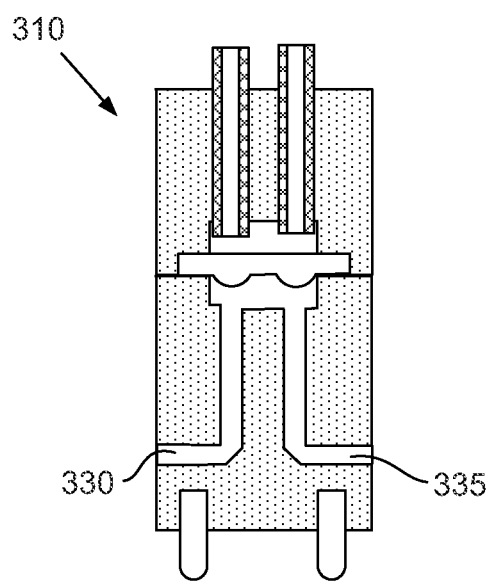

FIG. 3C is a diagram of an illustrative receiver/transmit optical interconnect (310). In this illustrative embodiment, one side of the waveguide T is split into two separate channels, a left channel (330) and a right channel (335). The left channel (330) and right channel (335) are both L shaped, with a reflective surface located in the corner of each of the channels. This reflective surface redirects the light traveling through the L shaped channel. One channel can be used to receive optical information from the hollow metal waveguide and the other side may be used to transmit optical configuration back into the hollow metal waveguide and vice versa. Each of the channels (330, 335) has a reflective wall which changes the angle of collimated optical energy traveling in the channel by 90 degrees. This configuration can be advantageous when it is desirable for the entire optical beam in a hollow metal waveguide to be removed, processed, and then returned in an altered or new form into the same waveguide. For example, if an optical signal needs phase correction, the entire optical signal can be removed, phase corrected, and returned to the hollow metal) waveguide using the receive/transmit optical interconnect (310). A variety of other operations could be performed, including amplification and filtering.

Figure 3D:
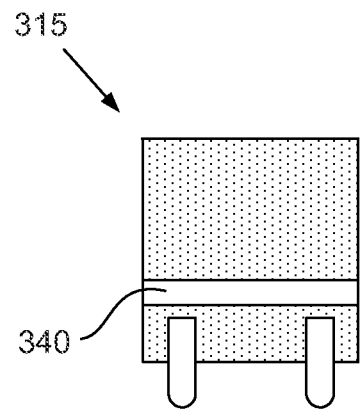

FIG. 3D is a diagram of an illustrative pass-through optical interconnect (315). In this illustrative embodiment, the optical interconnect includes a horizontal waveguide segment (340) which connects a left waveguide in an optical backplane to a right waveguide in the optical backplane. This pass-through optical interconnect (315) could be used to fill a socket (110, FIG. 1) which is not currently in use. This would protect the waveguides which terminate in the socket from contamination or damage. Additionally, the waveguide segment (340) in the pass-through optical interconnect (315) may be not pass straight from one waveguide on the left to the directly opposing waveguide on the right. Rather, the waveguide segment (340) may be used to reroute optical signals to a desired optical waveguide.

Figure 4A:
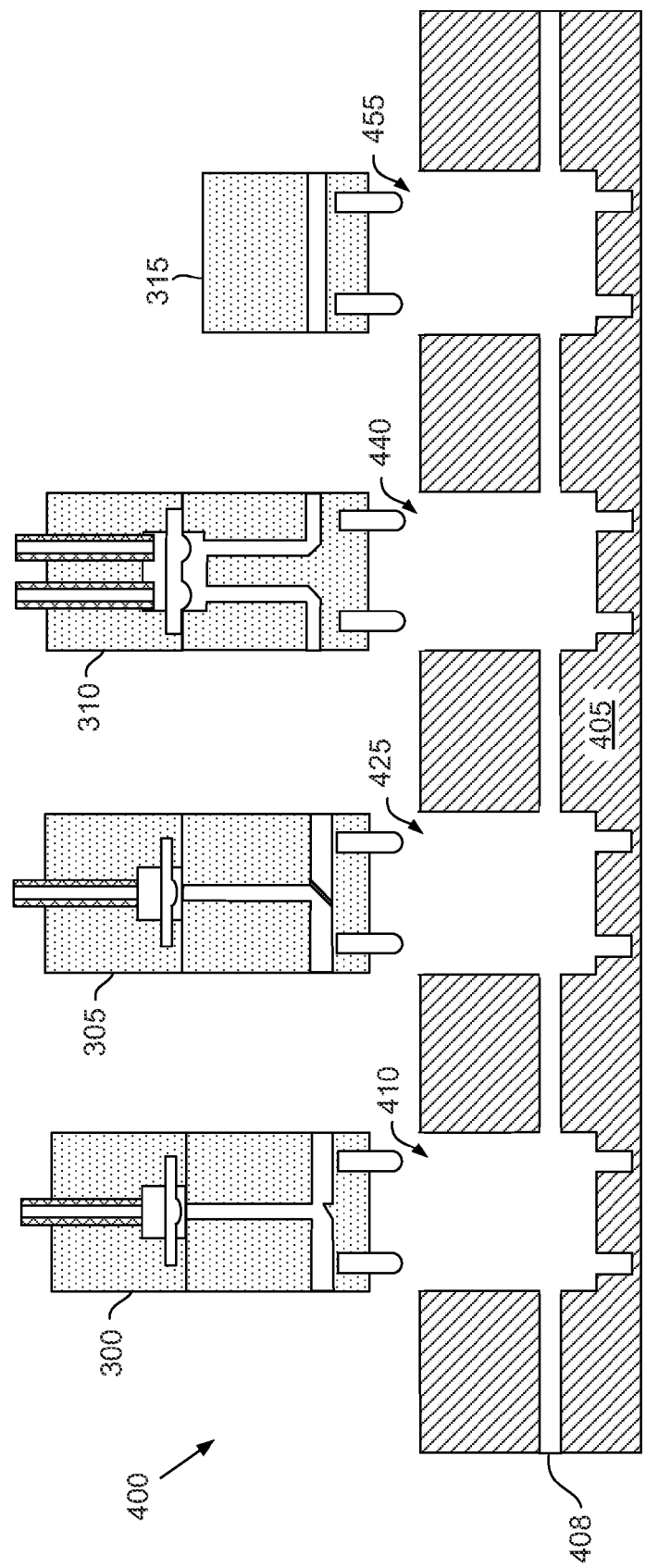
FIGS. 4A and 4B are illustrative embodiments of various optical interconnects which interface with an optical backplane, according to one embodiment of principles described herein.
Figure 4B:
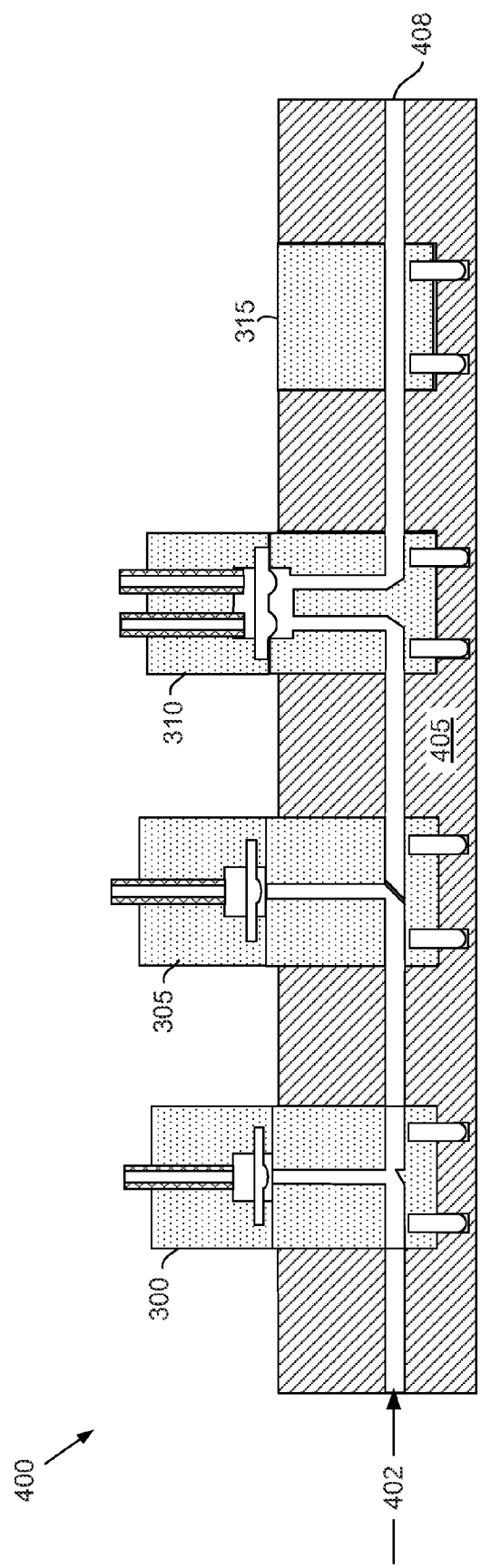

FIGS. 4A and 4B are cross-sectional diagrams of one illustrative embodiment of an optical interconnect system (400). In this illustrative embodiment, the optical backplane (405) contains a hollow metal waveguide (408) and sockets (410, 425, 440, 455). The interconnects (300, 305, 310, 315) are configured to fit within the sockets (410, 425, 440, 455) and collimate the outputs of the optical fibers and/or direct input beams into the optical fiber apertures. A first interconnect is an area-based splitter interconnect (300) and a second interconnect is a split/combine optical interconnect (305). A third interconnect is a receive/transmit optical interconnect (310) which includes a left channel and a right channel. A fourth interconnect is a pass-through interconnect (315) which is designed to fill a socket (410) and protect hollow metal waveguide (408) from contamination or damage. As discussed above, the interconnects (300, 305, 310, 315) and sockets (410, 425, 440, 455) are modular. Consequently, any interconnect may be mated with any socket. In FIG. 4A, the area base splitter interconnect (300) is above a first socket (410), the split/combine optical interconnect (305) is above a second socket (425), the transmit/receive optical interconnect (310) is above a third socket (440), and the pass through interconnect (315) is above a fourth socket (455).

FIG. 4B shows the various interconnects (300, 305, 310, 315) seated in the sockets (410, 425, 440, 455; FIG. 4A) of the optical backplane (405). In the illustrative configuration shown in FIG. 4B, a light ray (402) which is traveling from left to right through the hollow metal waveguide (408) first encounters the area based splitter of the first interconnect (300). The area base splitter directs a portion of the light ray upward into the first interconnect (300) where it is focused by the micro lens into the optical fiber. The remaining portion of the light ray continues traveling through the hollow metal waveguide (408) and encounters the split/combine element. A portion of the optical energy is directed upward into the second interconnect (305). The remaining optical energy continues through the hollow metal waveguide (408) and is all diverted into the left channel of the third interconnect (310). The third interconnect (310) may transmit the same optical signal or a different signal out of the right channel. This signal then moves through the hollow metal waveguide (408) and pass-through interconnect (315).

Figure 5:
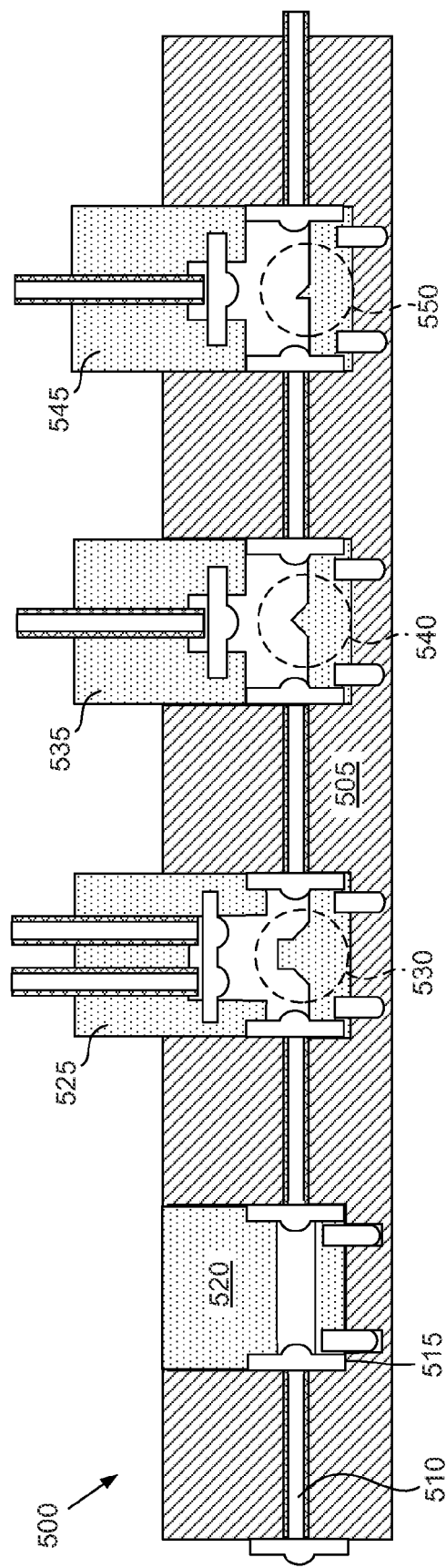
FIG. 5 is an illustrative embodiment of various optical interconnects which are connected to a fiber-based optical backplane, according to one embodiment of principles described herein.

FIG. 5 is a cross sectional diagram of an illustrative optical interconnect system (500) which uses optical fiber (510) as waveguide in the optical backplane (505) rather than the hollow metal waveguides illustrated in previous figures. In this illustrative embodiment, the interconnects (520, 525, 535, 545) are substantially similar to those described above in FIGS. 4A and 4B. A variety of optical components (530, 540, 550) and additional lenses (515) are formed within the interconnects (520, 525, 535, 545). The additional lenses (515) are used to transition the light from the fibers into collimated free space and back again. As the light exits the fibers in the interconnects, the light is collimated by the micro lenses. The various optical components (530, 540, 550) then manipulate the collimated light, which is then directed into the optical fiber (510) in the optical backplane (505). The transmission of light from the optical fiber (510) into the interconnects occurs in a similar fashion, with the light exiting the optical fiber (510) being collimated by the associated micro lens (515) and interacting with the optical components in the socket, if any. The portion of light which is directed upward into the interconnects is focused into the associated optical fibers.

Figure 6A:
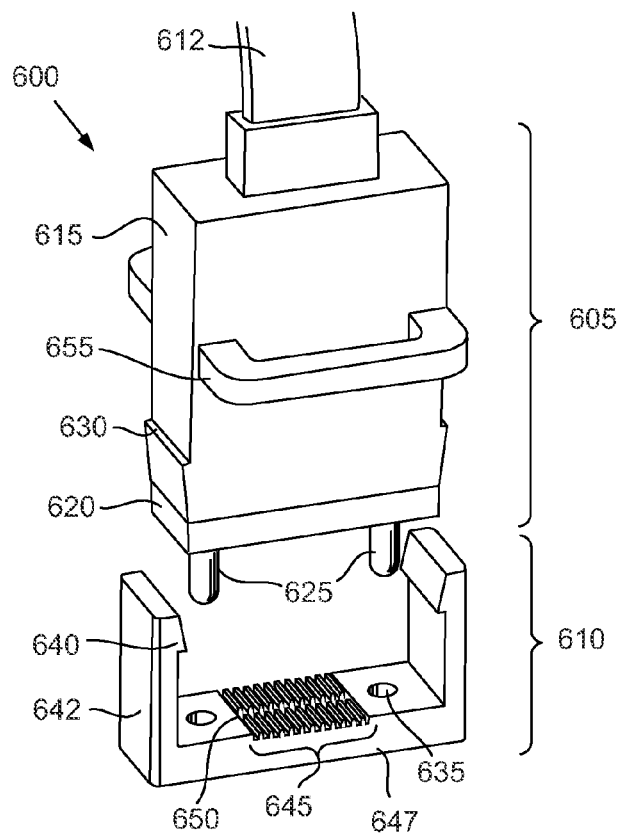
FIGS. 6A and 6B are perspective views of a modular optical interconnect, according to one embodiment of principles described herein.
Figure 6B:
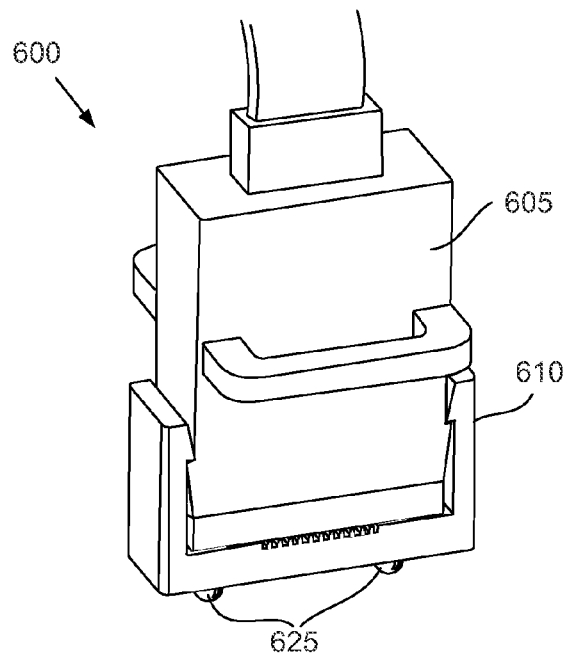

FIGS. 6A and 6B are perspective views of an illustrative interconnect (600) which includes a interconnect body (605) and a personality module (610) which snaps onto the interconnect body (605). According to one illustrative embodiment, an optical ribbon (612) is connected to the interconnect body (605). The optical ribbon (612) may contain one or more optical fibers or other optical channels. In the example illustrated in FIGS. 6A and 6B, the optical ribbon (612) is made up of 12 separate optical fibers. The fiber ribbon (612) may be positioned within the interconnect body (615) using a V-groove which directs the terminal end of the fiber ribbon into a desire position in the interconnect body (615). The alignment of the fiber ribbon (612) with the interconnect body (615) may take place during the manufacturing or may be done in the field.

The optical fibers terminate in the body (615) of the interconnect body (605) and are collimated by an array of micro lenses (620). The body (615) of the interconnect body (605) includes side ledges (630) and C brackets (655). Two precision pins (625) extend from the body (615) and through the micro lens array (620). According to one illustrative embodiment, the pins (625) may provide alignment for the micro lens array (620). A variety of other alignment techniques could be used, including spheres in cones, block in corner, and other techniques. These techniques could be modified or combined to provide the desired level of alignment for a given application. As previously discussed, the micro lens array (620) may be adhered to the bottom of the body (615) and the terminal ends of the optical fibers using an index matched optical adhesive. Additionally or alternatively, a variety of other bonding techniques may be used.

The use of a single piece micro lens array (620) which contains the collimating optics for all optical fibers in the ribbon (612) provides a number of advantages. First, it eliminates the requirement to make a large number of individual optics. Second, the micro lens array (620) is larger than the individual optics and consequently easier to handle. Third, the alignment is simpler because the entire micro lens array (620) can be aligned with the body (615) at the same time.

The personality module (610) is U shaped bracket with horizontal base (647) and two arms (642) which extend upward. The horizontal base (647) includes two holes (635) which are configured to receive pins (625). When the pins (625) are pushed into the holes (635) and the bottom surface of the micro lens array (620) contacts the upper surface of the horizontal base (647), the body (605) is aligned with the personality module (610). Each arm (642) has an overhang (640) which seats onto the ledge (630) in the body (615) to secure the personality module (610) to the body (605).

In this illustrative embodiment, twelve separate waveguide segments (645) are formed in the upper surface of the horizontal base (647). A central portion (650) of the waveguide segments (645) contains the various optical elements, such as an area based tap, receive/transmit optics, optical filter/reflector, divide/combine optics, and pass through waveguides discussed above. A variety of other optical elements could be included. By way of example and not limitation, the optical elements could include optical detectors, optical sources, beam dumps, a variety of prisms, mirrors, beam splitters, wavelength selective fitters, or other optical elements. These optical elements manipulate the collimated light entering the interconnect from the backplane and/or collimated light produced by the micro lens array (620). A given personality module (610) may include twelve or more of the same optical elements or any other combination of optical elements which is desired. Additionally, a personality module may also be configured in two or more levels in order to transmit and receive light that is present in hollow metal waveguides which are stacked on top of each other.

FIG. 6B is an illustrative diagram of the body (605) seated into the personality module (610). According to one illustrative embodiment, the length of pins (625) is such that the pins protrude out of the bottom of the personality module (610) when the body (605) is seated into the personality module (610). This allows the pins (625) to be received by alignment holes (145, FIG. 1) in the backplane (140, FIG. 1).

According to one illustrative embodiment, the components of the interconnect (600) may be plastic injection molded. A wide variety of plastics could be used, such as thermoplastics, thermosets, glass filled polycarbonate, and elastomers. In some situations it may be desirable to use different polymers for different elements within the interconnect. For example, a relatively rigid polymer may be used for the body (605), while a much more flexible polymer may be used for the compliant latches and strain relief of the optical ribbon cable. The ability to use inexpensive manufacturing techniques such as plastic injection molding to produce the optical interconnects can significantly reduce the price of the interconnect. Further, the body (605) and micro lens array (620) are common to all interconnects, regardless of interconnect's functionality. This further reduces the part count and expense of manufacturing.

Figure 7:
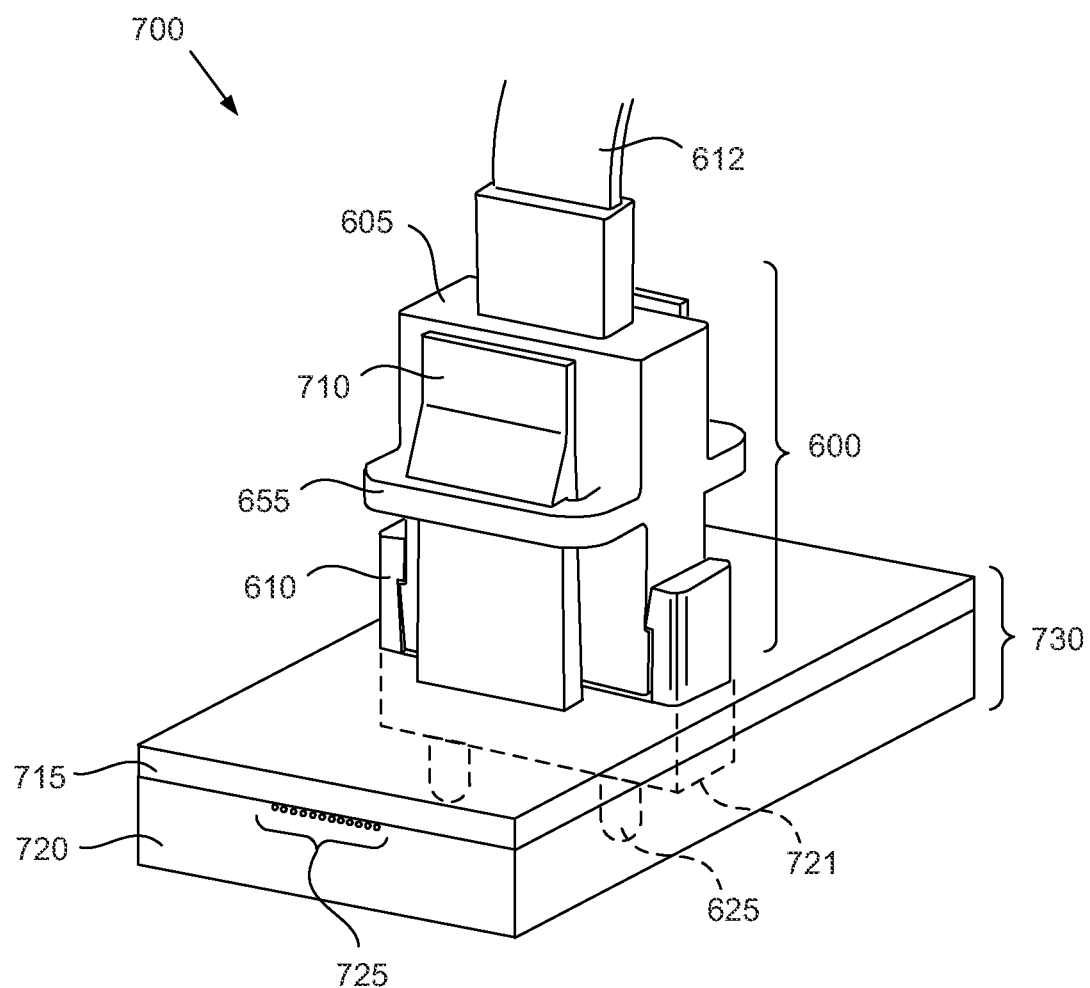
FIG. 7 is a perspective view of a modular optical interconnect connected to an optical backplane, according to one embodiment of principles described herein.

FIG. 7 is a perspective view optical interconnect system (700) which includes the interconnect (600) seated into the optical backplane (730). For clarity, only a portion of the optical backplane (730) has been illustrated. The optical backplane (730) could include a number of other components, sockets, and optical channels.

As discussed above, the body (605) is seated into the personality module (610) to form the interconnect (600). The optical backplane (730) includes a socket (721) and compliant latches (710). As previously discussed the pins (625) extend from the bottom of the personality module (610) and into alignment holes (145, FIG. 1) in the bottom of the socket (721). The compliant latches (710) extend up through the C brackets (655) to capture the interconnect (600). In this configuration, the pins (625) provide alignment and the compliant latches (710) retain the interconnect (600) in position. A number of other connection schemes could be used to align and secure the personality module (610), interconnect body (605) and the backplane (730).

The backplane (730) includes a number of optical channels (725). According to one illustrative embodiment, the optical channels (725) are hollow metal waveguides. As discussed above, hollow metal waveguides may be constructed in a variety of substrates, including silicon, glass or plastic. According to one illustrative embodiment, precision grooves are cut in a base portion (720) of the backplane. The precision grooves are then coated with a reflective coating. The undersurface of a top plate (715) is also coated with a reflective coating. The base portion (720) and the top plate (715) are then joined together to form enclosed hollow metal waveguides. Additionally, or alternatively, the backplane (730) could have a variety of other configurations, including molded polymer waveguides or embedded optical fibers.

Figure 8:
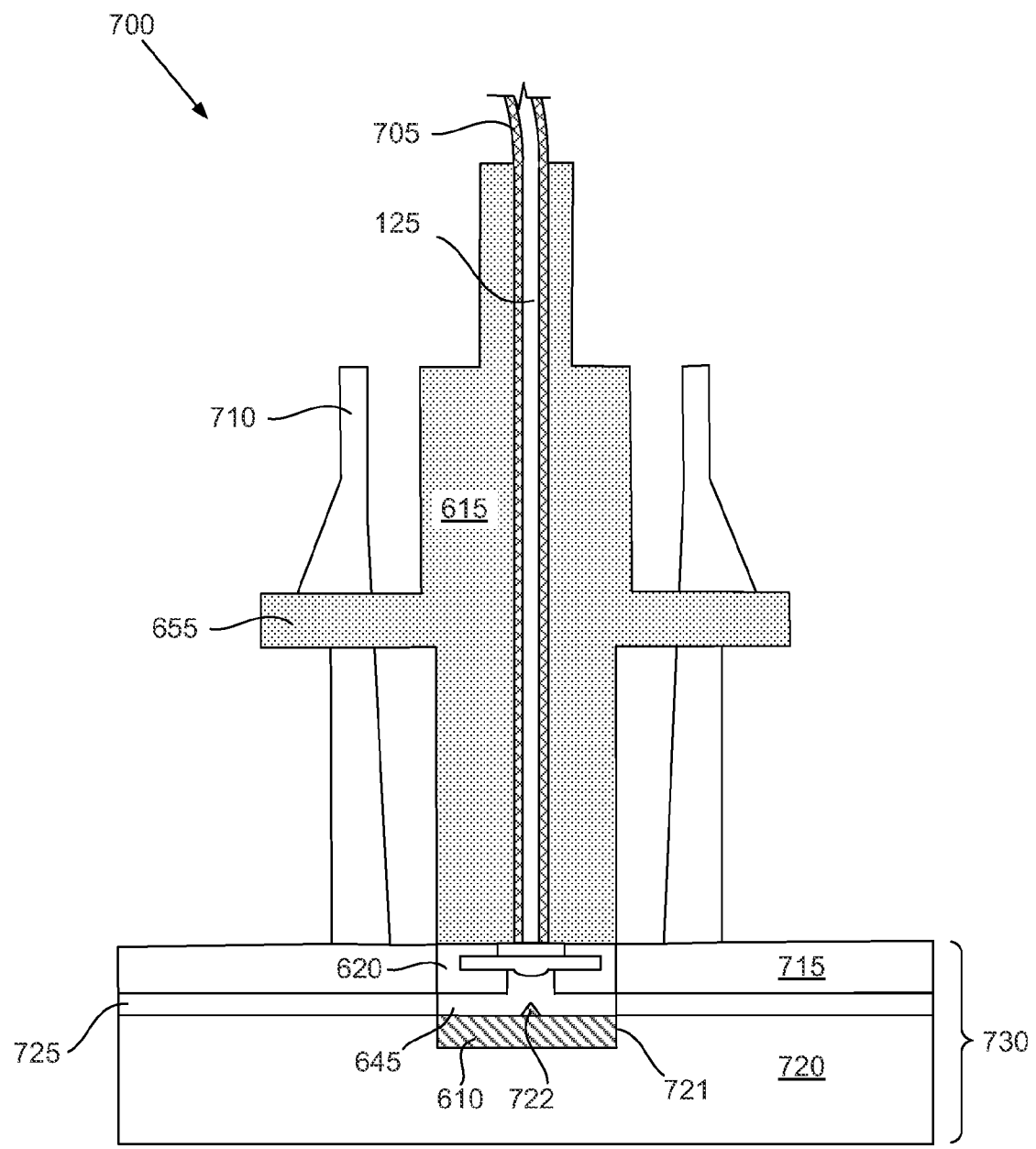
FIG. 8 is a side view of a modular optical interconnect connected to an optical backplane, according to one embodiment of principles described herein.

FIG. 8 shows a cross-sectional diagram of one illustrative embodiment of optical interconnect system (700). The optical ribbon (705) enters the interconnect body (615). The individual fibers (125) which make up the ribbon (705) terminate at or near the bottom surface of the interconnect body (615). The lens array (620) is joined to the interconnect body (615) as described above. The personality module (610) is snapped onto the interconnect so that the waveguide segments (645) of the personality module (610) are aligned with waveguide channels (725) in the optical backplane (730). The personality module (610) may include one or more optical elements (722) within the waveguide segments (645).

As discussed above, the optical backplane (730) may be made up of a base portion (720) and a top plate (715). The compliant latches (710) extend up through the C brackets (655) to capture the interconnect body (615). According to one illustrative embodiment, the optical ribbon and its fibers are permanently joined to the interconnect body (615). By simply interchanging current personality module (610) for a new personality module, the configuration of the optical interconnect system (700) can be altered. FIGS. 9A through 12 illustrate plug-and-play configurations which can be achieved simply by unplugging a interconnect, removing a first personality module and replacing it with another personality module, and plugging the interconnect back into the optical backplane.

Figure 9A:
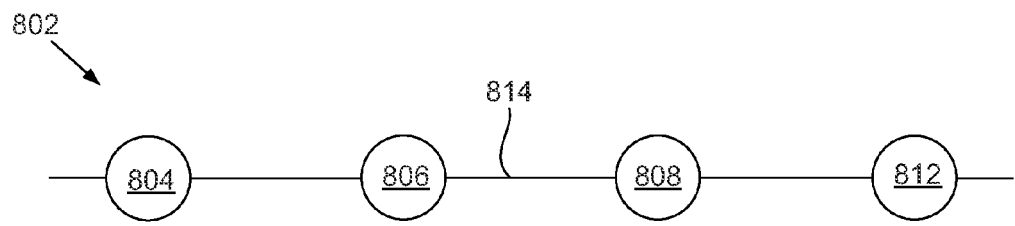
FIG. 9A is a diagram of a daisy chain network architecture, according to one embodiment of principles described herein.

FIG. 9A is a diagram of art illustrative serial network architecture (802) or daisy chain. In a serial network architecture (802), physical interconnections (814) are made point-to-point between the nodes (804, 806, 808, 812) of the network. In this network configuration, an optical signal traveling from the left to the right through the network (802) is first intercepted by a first node (804). The first node (804) performs whatever operations are desired on the optical signal. The first node (804) may or may not transmit an optical signal to the second node (806). If a signal is passed to the second node (806), the second node intercepts the signal and may or may not pass a signal to the third node (808), and so forth.

Figure 9B:
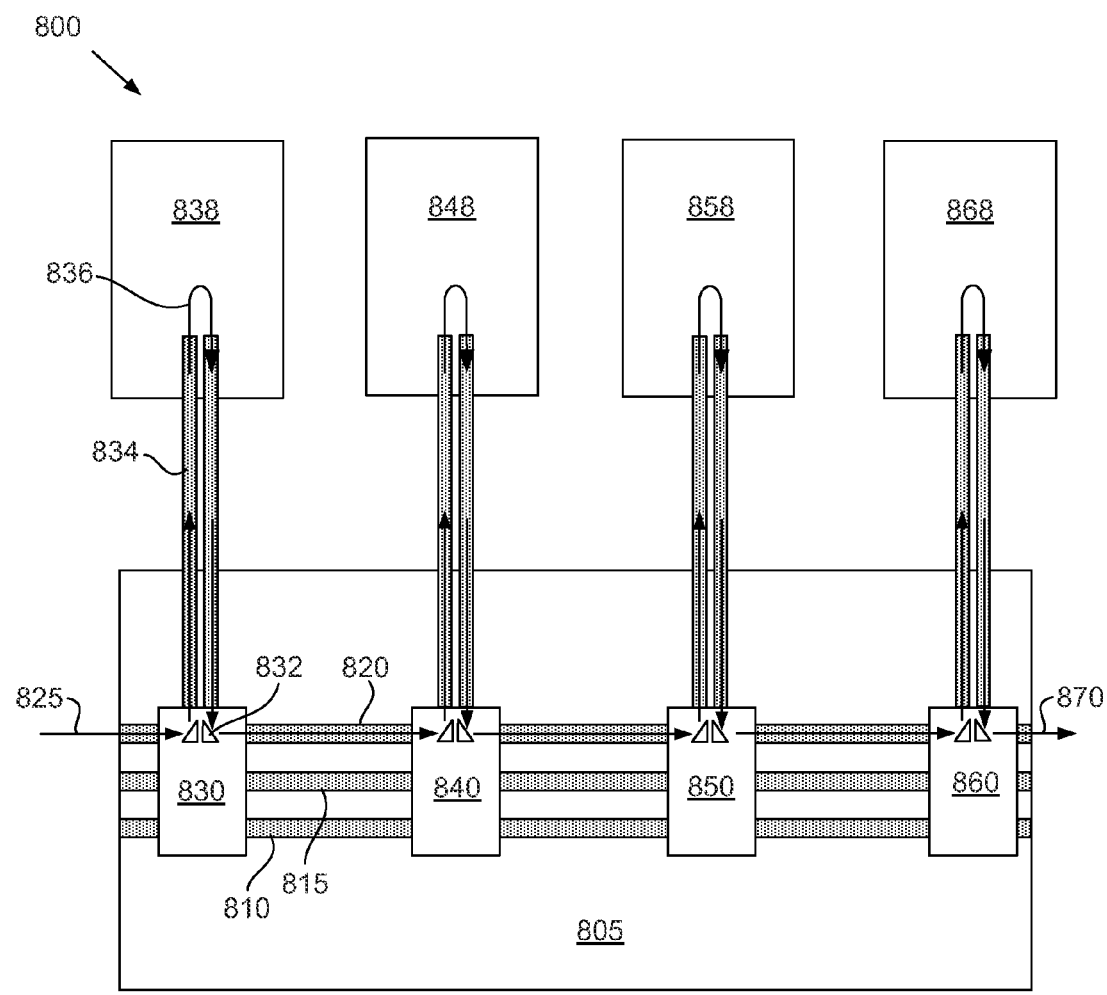
FIG. 9B is a diagram of an optical interconnect system which is configured in a daisy chain network architecture, according to one embodiment of principles described herein.

As shown in FIG. 9B, this serial network architecture can be easily realized using a single optical channel (820) on the optical backplane (805). For clarity, only relevant portions of the interconnects are shown. For example, in FIG. 9B, only the outline of the personality modules and relevant optical components within the personality modules are shown. The personality modules (830, 840, 850, 860) of the each interconnect are selected so that a transmit/receive optical element is in the path of the optical channel (820). Optical ribbons (834) connect the various nodes (838, 848, 858, 868) to the appropriate interconnects. The nodes (838, 848, 858, 868) may be purely optical in nature, primarily electronic, or may be a combination of optical and electronic.

As the optical signal (825) enters from the left, it is diverted by the receive/transmit optical element (832) in the first personality module (830) into the ribbon (834) and transmitted to the first node (838). The first node (838) receives the optical signal, processes it, and resends the signal back down the ribbon (834). The receive/transmit optical element (832) then directs the signal to the next personality module and the process is repeated. This configuration results in the serial architecture described in FIG. 9A.

Figure 10A:
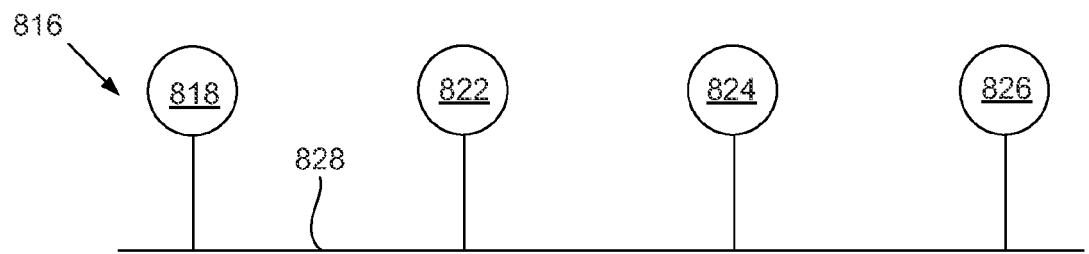
FIG. 10A is a diagram of a bus network architecture, according to one embodiment of principles described herein.

By simply unplugging the interconnects and replacing the personality modules (830, 840, 850, 860) with new personality modules which have different optical elements, the architecture of the network can be changed. FIG. 10A illustrates a bus topography (816). In a bus topography (816), each node (818, 822, 824, 826) is connected to a single communication channel (828). A signal from the source travels to each node in the network (818, 822, 824, 826).

Figure 10B:
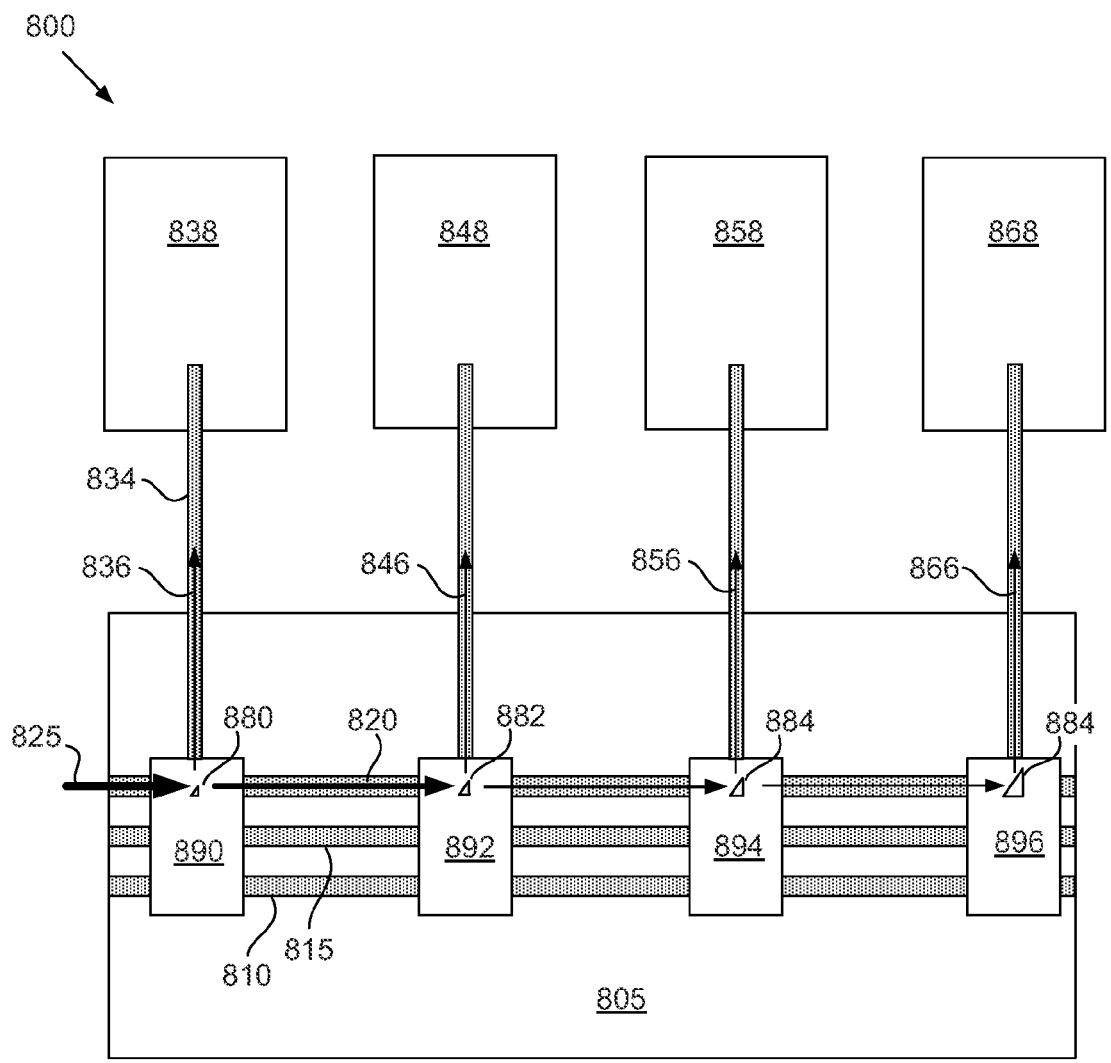
FIG. 10B is a diagram of an optical interconnect system which is configured in a bus network architecture, according to one embodiment of principles described herein.

According to one illustrative embodiment, the optical interconnect system (800) is reconfigured from the daisy chain topography illustrated in FIG. 9B to the bus architecture of FIG. 10B by replacing the all the personality modules shown in FIG. 9B with a series of new personality modules (890, 892, 894, 896) which have progressively larger area based taps (880, 882, 884, 884). The incoming signal (825) is split by the first area based tap (880) to divert 25% of the total signal power to into a new signal (836) which travels along the optical ribbon (834) to the first node (838). The remaining 75% of the signal passes to the second personality module (892) which contains a larger area based tap (882). This tap (882) also extracts 25% of the original signal and passes this signal (846) to the second node (848). Similarly, the remaining 50% of the original signal is progressively distributed to the other two nodes (858, 868) as signals (856, 866) created by other personality modules (894, 896). The final area based tap (884) covers the entire area of the waveguide (820) and directs the entire remaining optical signal (866) to the last node (868).

Figure 11A:
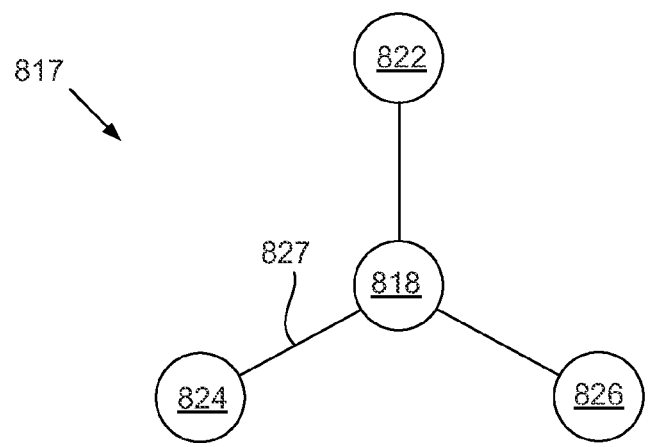
FIG. 11A is a diagram of a star network architecture, according to one embodiment of principles described herein.
Figure 11B:
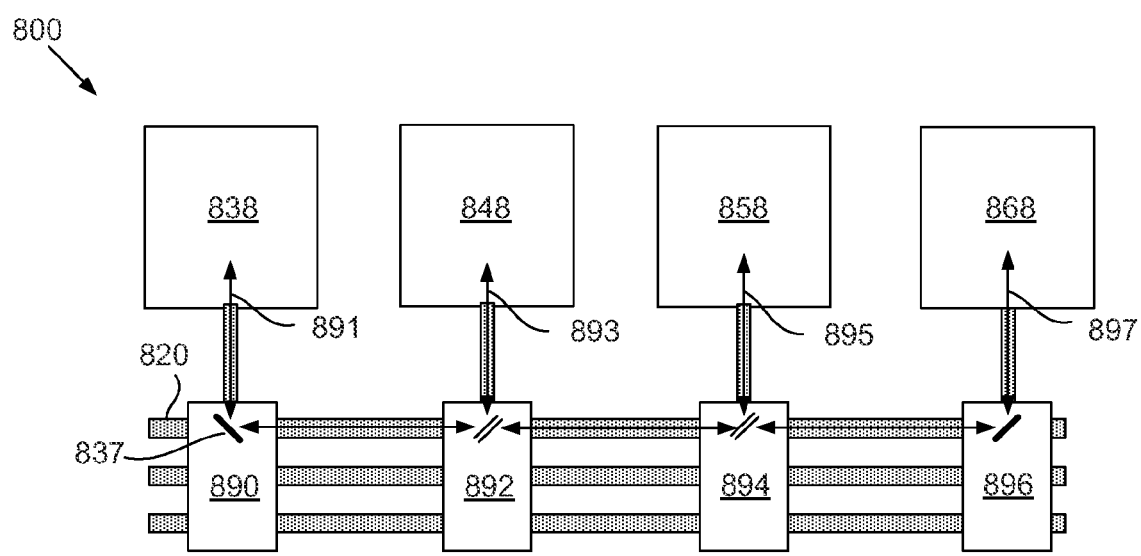
FIG. 11B is a diagram of an optical interconnect system which is configured in a star network architecture, according to one embodiment of principles described herein.

FIG. 11A illustrates a star network architecture (817) which includes a central node (818) which is separately connected to each of three surrounding nodes (822, 824, 826) by communication links (827). FIG. 11B shows an illustrative reconfiguration of the optical interconnect system (800) into a star network architecture. In this embodiment, the first node (838) is the central node and separately communicates within each of the other nodes using a bi-directional signal (891).

The bi-directional signal (891) is composed of three different wavelengths of optical energy. This bi-directional signal (891) is transmitted to the first personality module (890) which contains a mirror (837) which reflects all wavelengths of light down the optical channel (820) to the other nodes. A second personality module (892) has a wavelength selective tap (847) which diverts a first signal having a first wavelength (893) to the second node (848) and allows the other wavelengths to pass through to the other nodes (858, 868). Similarly, the other personality modules (894, 896) divert their respective wavelength signals (895, 897) to the proper nodes (858, 868). Each of the star nodes (848, 858, 868) responds using the same wavelength that it receives. Thus, separate two-way communication is created between each of the star nodes (848, 858, 868) and the central node (838).

The configurations shown in FIGS. 9A-11B are only simple examples of optical interconnect configurations which are easily obtained by using a single optical channel and the appropriate personality modules. The other channels could also be used to create more complex or robust networks or to perform other operations which are desired by the user.

Figure 12:
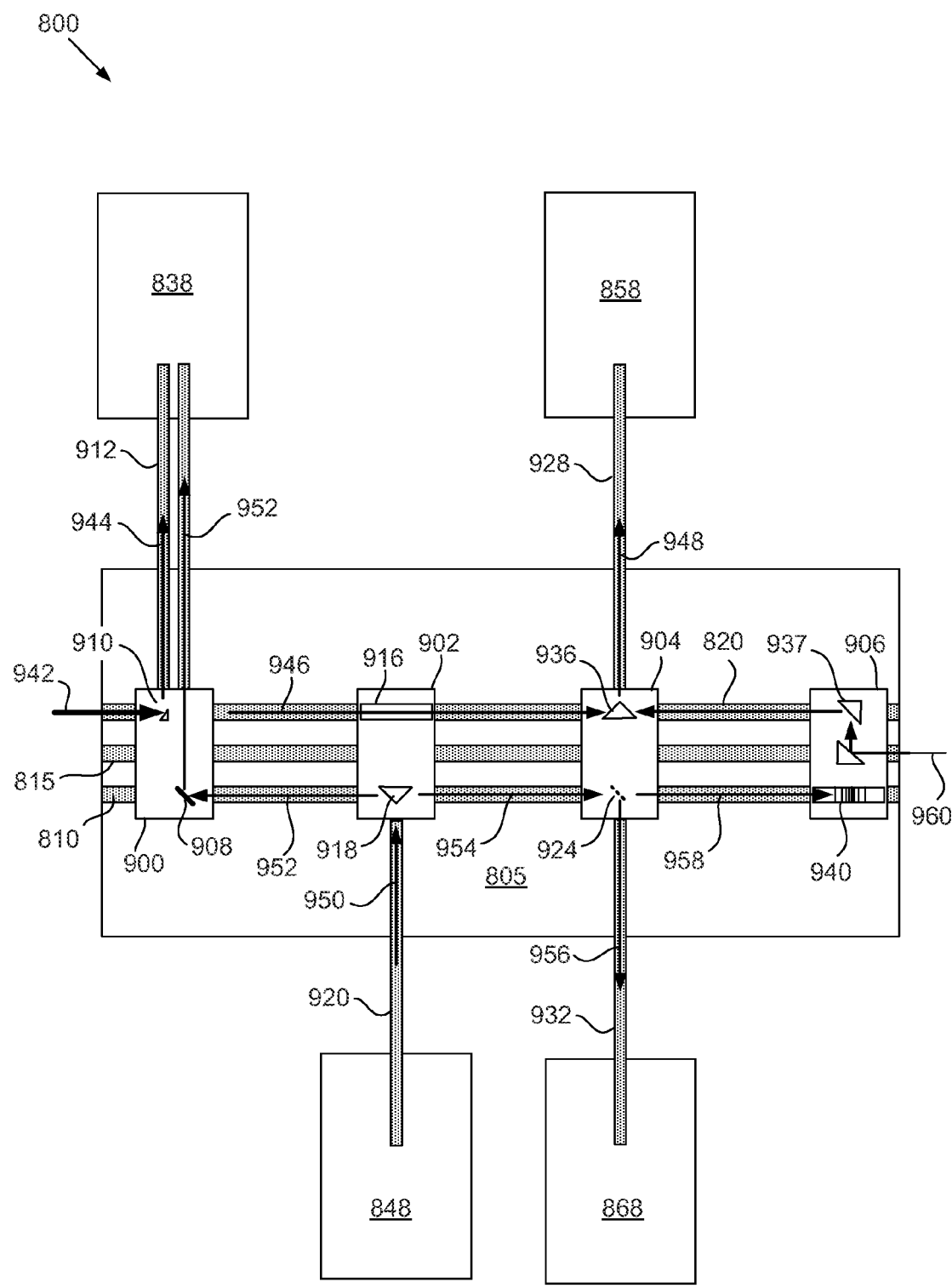
FIG. 12 is a diagram of an optical interconnect system has been customized by inserting modular optical interconnects into an optical backplane, according to one embodiment of principles described herein.

FIG. 12 illustrates a customized configuration of the optical interconnect system (800). This customized configuration uses the same optical backplane (805), optical channels (810, 815, 820), and same nodes (838, 848, 858, 868) as the configurations illustrated in FIGS. 9B, 10B, and 11B. The most significant physical difference between this configuration and the other configurations is that the personality modules on the bottom of the various interconnects have been replaced with new personality modules (900, 902, 904, 905). These personality modules (900, 902, 904, 905) include a variety of optical elements (908, 910, 918, 924, 936, 937, 940).

In the embodiment illustrated in FIG. 12, a first input signal (942) enters the upper optical channel (820) from the left and encounters an area based tap (910) which is housed in a first personality module (900). The area based tap (910) directs a portion (844) of the first input signal into the ribbon (912) connected to the first node (838). The remaining signal (946) passes through a pass-through (916) contained in a second personality module (902) and is diverted by a combiner element (936) contained in the third personality module (904) and into ribbon (928) and third node (856).

A second input signal (960) enters the system (800) from the right through the center optical channel (815). The second input signal (960) encounters translating optical elements (937) in the fourth personality module (906) which transfers the second input signal (960) from the center optical channel (815) to the upper optical channel (820). The second input signal (960) is then reflected upward into the third ode (858) by the combiner element (936) in the third personality module (904) to form a combined signal (948) in the optical ribbon (928).

A third input signal (950) is generated within the second node (848) and passes through the optical ribbon (920) to the second personality module (902) where it encounters a divider (918). A portion of the signal (952) goes to the left, encounters a reflective element (908) in the first personality module (900) and is reflected upward through a ribbon channel to the first node (838). The right hand portion (954) encounters a spectral reflector (924) in the third personality module (904) and is split into a first wavelength signal (956) and a second wavelength signal (958). The first wavelength signal (956) passes along a ribbon channel (932) to the fourth node (868). The second wavelength signal (958) continues through the spectral reflector (924) and is absorbed in a beam dump (940) contained in the fourth personality module (906). A beam dump (940) is an optical element which is used to absorb a beam of light. The beam dump (940) is designed to absorb incident tight rays and prevent back reflections and scattering. To minimize scattering, the beam dump (940) may be formed from a relatively deep, dark cavity or cavities which are designed to absorb and contain the incident light.

Figure 13:
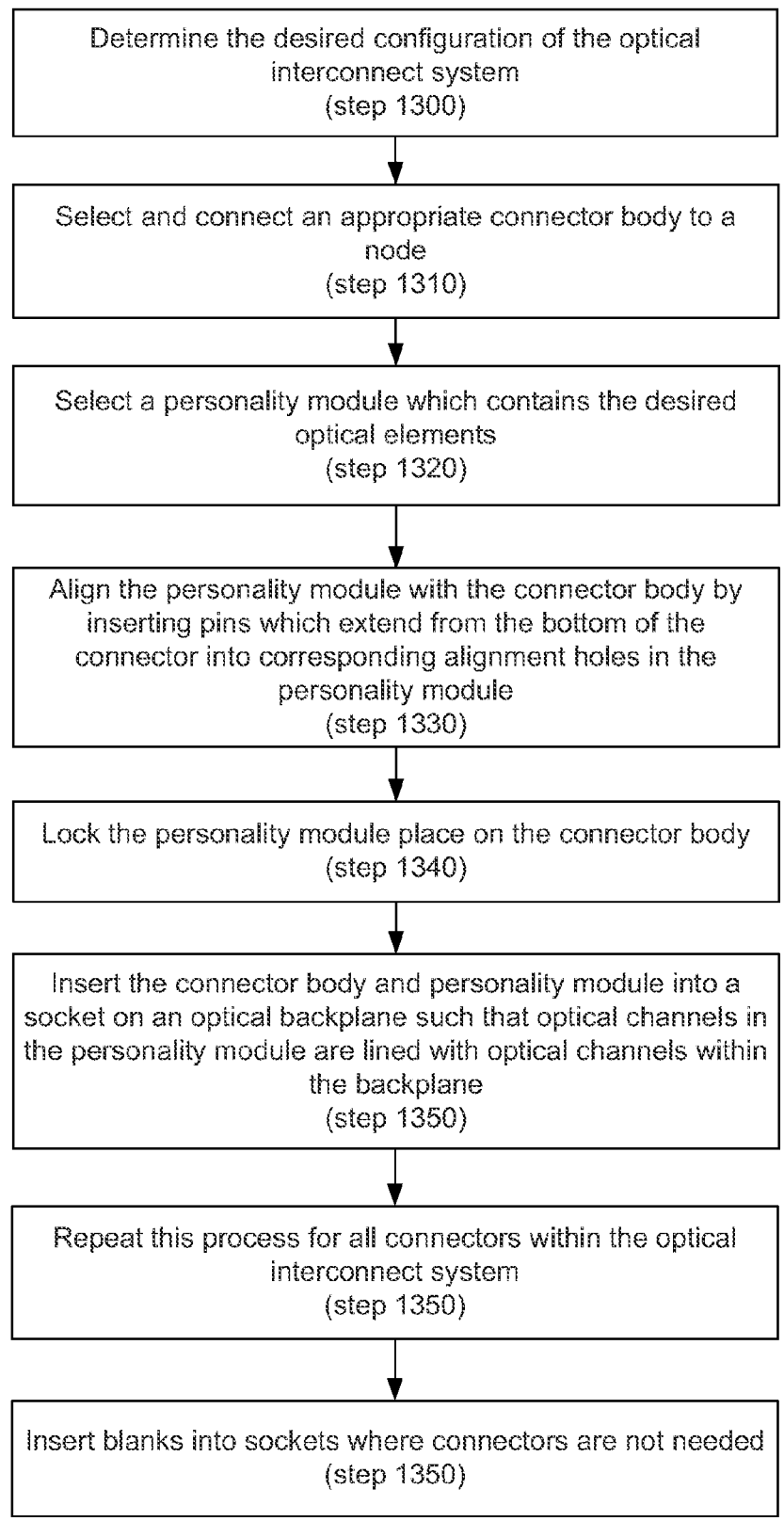
FIG. 13 is a flowchart which shows one illustrative method for reconfiguring an optical interconnect system using modular optical interconnects, according to one embodiment of principles described herein.

FIG. 13 is a flowchart which describes one illustrative method of configuring an optical interconnect system. In a first step, the desired configuration of the optical interconnect system is determined (step 1300). The appropriate interconnect body is selected and connected to the node by optical fibers (step 1305). The interconnect body includes optics which collimate the output of optical fibers. A personality module is selected which contains the desired optical elements (step 1310). The personality module is aligned to the interconnect body by inserting pins which extend from the bottom of the interconnect body through corresponding alignment holes in the personality module (step 1315). The personality module is then locked into place to secure it to the interconnect body in an aligned position (step 1320). The interconnect body and personality module are then inserted into a socket in an optical backplane (step 1325) such that optical channels in the personality module are aligned to optical channels within the backplane. According to one illustrative embodiment, the pins which extend from the interconnect body extend through the personality module and are inserted into alignment holes in the optical backplane. This process is repeated for all interconnects which are within the optical interconnect system (step 1330). For sockets in the optical backplane where interconnects are not needed, blanks are inserted to protect the optical channels within the backplane (step 1335).

In sum, the optical interconnect system described above provides low cost, plug-and-play, high density optical interconnects using injection molded interconnects. These modular optical interconnects allow for point-to-point connections, splitting, combining, multicasting, etc., on the same optical backplane. These modular optical interconnects are compatible with either hollow metal waveguides or regular solid core waveguides. The modular optical interconnects produce collimated beams from optical fibers. The collimated beams allow for larger misalignment tolerances than other approaches and reduce the cost of the component parts. In contrast to conventional hardwired systems, the optical interconnect system allows for significant plug-and-play reconfiguration with very minimal cost and time.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. An optical interconnect comprising:
an optical waveguide;
an interconnect body, the optical waveguide terminating in the interconnect body;
a micro lens which collimates light exiting the optical waveguide to produce a collimated beam;
a first personality module comprising an optical element which is placed to operate on the collimated beam;
the first personality module being aligned with and detachably connected to the interconnect body, such that different personality modules comprising different optical elements which operate differently on the collimate beam can be detachably connected to the interconnect body;
in which the optical interconnect is configured to be inserted into a socket in an optical backplane, the first personality module being further placed to operate on the light passing between the optical backplane and the optical interconnect; and
a second personality module configured to selectively replace the first personality module, the second personality module reconfiguring a network architecture of the optical backplane.

2. The optical interconnect of claim 1, in which the optical backplane comprises a number of hollow metal waveguides, the hollow metal waveguides being configured to receive light from the optical interconnect and transmit light to the optical interconnect.

3. The optical interconnect of claim 1, further comprising alignment elements, the alignment elements extending outward from the interconnect body, through the personality module, and into receiving elements in the optical backplane.

4. The optical interconnect of claim 3, in which the micro lens comprises an injection molded micro lens array, with pins passing through the micro lens array such that the micro lens array is aligned with optical fiber.

5. The optical interconnect of claim 1, wherein said collimated light beam has a diameter greater than the optical waveguide.

6. The optical interconnect of claim 1, in which the first personality module is configured to selectively direct a portion of light passing through the optical backplane into the optical waveguide.

7. The optical interconnect of claim 1, wherein said optical waveguide comprises an optical fiber and further comprising an index matching adhesive between an end of the optical fiber and the micro lens, wherein the index matching adhesive has an optical index of refraction matched to that of the optical fiber.

8. The optical interconnect of claim 7, wherein the end of the optical fiber is saw cut.

9. The optical interconnect of claim 1, wherein the optical element of the first personality module is a reflective wedge which divides the collimate beam into two output beams.

10. The optical interconnect of claim 1, wherein the interconnect body is configured to snap to the first personality module so as to be detachably connected to the interconnect body.

11. An optical interconnect system comprising:
an optical backplane;
a socket in the optical backplane which exposes optical channels in the optical backplane;
an interconnect body;
an optical waveguide configured to be connected to an exterior node, the optical waveguide terminating in the interconnect body to form a terminal end;
a micro lens interfaced with the terminal end of the optical waveguide to collimate light exiting the optical waveguide to produce a collimated light beam, wherein said collimated light beam has a diameter greater than the optical waveguide; and
a personality module connected to the interconnect body, in which the interconnect body and personality module are configured to be inserted into the socket such that optical channels within the personality module align with optical channels within the optical backplane, the personality module being configured to receive the collimated light beam; the personality module comprising an optical element configured to optically manipulate the collimated light beam and direct the collimated light beam into an optical channel in the optical backplane;

the personality module being further configured to be removed from the interconnect body and replaced by a second personality module with a different optical element.

12. The system of claim 11 in which the optical element is at least one of: splitter/combiner, a spectral tap, modulator, switch, a beam dump, a pass-through, an area based tap, or a transmit/receive element.

13. The system of claim 11, in which the optical channels within the optical backplane are hollow metal waveguides configured to direct optical energy.

14. The system of claim 11, in which an architecture of the optical interconnect system can be reconfigured by replacing the personality module.

15. The system of claim 11, further comprising index matched adhesive interposed between the terminal end of the optical waveguide and the micro lens.

16. The system of claim 11, further comprising alignment pins extending from an interfacing surface of the interconnect body, the alignment pins being configured to pass through alignment holes in the personality module such that the personality module is optically aligned with the micro lens.

17. The system of claim 16, in which the terminal ends of the alignment pins are received by alignment holes in the optical backplane, such that waveguide segments in the personality module are aligned with optical channels in the optical backplane.

18. The system of claim 11, in which at least portion of a surface which interfaces with the upper portion of the personality module is optically reflective such that when the personality module is coupled with the interconnect body, a hollow metal waveguide is formed.

19. An optical interconnect system comprising:
an optical backplane;
a socket in the optical backplane which exposes optical channels in the optical backplane;
an interconnect body;
an optical waveguide configured to be connected to an exterior node, the optical waveguide terminating in the interconnect body to form a terminal end;
a micro lens configured to interface with the terminal end of the optical waveguide to collimate light exiting the optical waveguide to produce a collimated light beam;
a personality module connected to the interconnect body, in which the interconnect body and personality module are configured to be inserted into the socket such that optical channels within the personality module align with optical channels within the optical backplane, the personality module being configured to receive the collimated light beam; the personality module comprising an optical element configured to optically manipulate the collimated light beam and direct the collimated light beam into an optical channel in the optical backplane; the personality module being further configured to be removed from the interconnect body and replaced by a second personality module with a different optical element; and
a waveguide T, the optical element being disposed at an intersection between the vertical and horizontal segments of the waveguide T.

20. An optical interconnect comprising:
an optical waveguide;
an interconnect body, the optical waveguide terminating in the interconnect body;
a micro lens which collimates light exiting the optical waveguide to produce a collimated beam;
a first personality module comprising an optical element which is placed to operate on the collimated beam;
the first personality module being aligned with and detachably connected to the interconnect body, such that different personality modules comprising different optical elements which operate differently on the collimate beam can be detachably connected to the interconnect body;
in which the optical interconnect is configured to be inserted into a socket in an optical backplane, the first personality module being further placed to operate on the light passing between the optical backplane and the optical interconnect;
wherein the optical element of the first personality module is a reflective wedge which divides the collimate beam into two output beams; and
further comprising a translator to move the reflective wedge laterally with respect to the optical waveguide to control the division of the collimate beam into two unequal output beams.

* * * * *

UNITED STATES PATENT AND TRADEMARK OFFICE
CERTIFICATE OF CORRECTION

| | |
|---|---|
| PATENT NO. | : 9,011,020 B2 |
| APPLICATION NO. | : 13/384883 |
| DATED | : April 21, 2015 |
| INVENTOR(S) | : Michael Renne Ty Tan et al. |

It is certified that error appears in the above-identified patent and that said Letters Patent is hereby corrected as shown below:

On the title page, item (75), Inventors, in column 1, line 3, delete "Huel Pei Kuo" and insert -- Huei Pei Kuo --, therefor In the specification Col. 9, l. 40 – fitters should be filters
Col. 12, l. 49 – ode should be node
Col. 13, l. 2 – tight should be light Signed and Sealed this
Seventeenth Day of November, 2015

Michelle K. Lee
*Director of the United States Patent and Trademark Office*